US007226984B2

(12) United States Patent
Iwata

(10) Patent No.: US 7,226,984 B2
(45) Date of Patent: Jun. 5, 2007

(54) BINDER FOR ELECTROSTATIC IMAGE DEVELOPING TONER

(75) Inventor: Masakazu Iwata, Otsu (JP)

(73) Assignee: Sanyo Chemical Industries, Ltd, Kyoto (JP)

( * ) Notice: Subject to any disclaimer, the term of this patent is extended or adjusted under 35 U.S.C. 154(b) by 0 days.

(21) Appl. No.: 10/512,591

(22) PCT Filed: Apr. 25, 2003

(86) PCT No.: PCT/JP03/05385

§ 371 (c)(1),
(2), (4) Date: Oct. 25, 2004

(87) PCT Pub. No.: WO03/091807

PCT Pub. Date: Nov. 6, 2003

(65) Prior Publication Data

US 2005/0164113 A1    Jul. 28, 2005

(30) Foreign Application Priority Data

Apr. 26, 2002    (JP)    ............................. 2002-125840

(51) Int. Cl.
*C08G 63/52*    (2006.01)
*C03G 9/08*    (2006.01)

(52) U.S. Cl. ................... 528/271; 528/306; 430/109.1; 430/109.3; 430/109.4

(58) Field of Classification Search ................ 528/271, 528/306; 430/109.1, 109.3, 109.4
See application file for complete search history.

(56) References Cited

U.S. PATENT DOCUMENTS

| | | | | | |
|---|---|---|---|---|---|
| 5,344,863 | A | * | 9/1994 | Sakai et al. | .................. 524/291 |
| 6,022,661 | A | * | 2/2000 | Kurose et al. | ........... 430/108.7 |
| 6,461,782 | B1 | * | 10/2002 | Sasada et al. | ............ 430/109.2 |

FOREIGN PATENT DOCUMENTS

| | | |
|---|---|---|
| JP | 7-114208 | 5/1995 |
| JP | 7-114209 | 5/1995 |
| JP | 7-175263 | 7/1995 |
| JP | 07-252449 | 10/1995 |
| JP | 9-146303 | 6/1997 |
| JP | 09-269608 | 10/1997 |
| JP | 11-218961 | 8/1999 |
| JP | 2000-143760 | 5/2000 |
| WO | WO-02/31052 A1 | 4/2002 |

* cited by examiner

*Primary Examiner*—Kriellion Sanders
(74) *Attorney, Agent, or Firm*—Edwards Angell Palmer & Dodge, LLP

(57) ABSTRACT

Provided is a binder for an electrostatic image developing toner using a polyester resin in which at least a part of a carboxylic acid component (a) and/or an alcohol component (b) comprises a carboxy-modified polyolefin or a hydroxyl-terminated polyalkadiene that may be hydrogenated containing an aliphatic hydrocarbon group (x) having a carbon number of 100 to 1,000. The binder is excellent in environmental stability and does not generate a peculiar odor around a copier or a printer when the binder is used in a toner, and a toner using the binder.

9 Claims, No Drawings

BINDER FOR ELECTROSTATIC IMAGE DEVELOPING TONER

CROSS-REFERENCE TO RELATED APPLICATION(S)

This application is a §371 application of copending international patent application PCT/JP03/05385 which was filed on Apr. 25, 2003, which is incorporated by reference.

TECHNICAL FIELD

The present invention relates to a binder for use in an electrostatic image developing toner and an electrostatic image developing toner, used for an electrophotograph, electrostatic recording, electrostatic printing, and the like.

BACKGROUND ART

An electrostatic image developing toner for a heat fixing method adopted generally as a fixing method of an image in a copier, a printer, and the like requires that a toner does not fuse with a heat roll even at a high fixing temperature (hot offset resistance); that a toner can be fixed even at a low fixing temperature (low temperature fixing properties); further that stable image quality be obtained even under the conditions of low temperature and low humidity to high temperature and high humidity (environmental stability); and the like. Polyester resin has been studied as a toner binder due to excellent low temperature fixing properties, and in particular there is disclosed that the use of polyester resin containing, as constituents, a bisphenol A-based monomer and an alkenylsuccinic acid-based monomer component having a carbon number of 12 to 44 can stably provide a suitable copy image (refer to, e.g., Japanese Unexamined Patent Application Publication No. 06-202374).

However, the polyester resin proposed above has excellent environmental stability, but has a peculiar odor. Thus, the use of a toner comprising said polyester resin generates a peculiar odor surrounding a copy machine or a printer; therefore, the toner is insufficient as a binder for an electrostatic image developing toner.

The present inventors have earnestly studied to solve the above-described problem, thereby leading to the present invention.

DISCLOSURE OF THE INVENTION

The present invention is a binder for use in an electrostatic image developing toner, comprising: a polyester resin (A) (hereinafter, simply also called as (A)) comprised of constituents of a carboxylic acid component (a) (hereinafter, simply also called as (a)) and an alcohol component (b) (hereinafter, simply also called as (b)), at least a part of an (a) and/or a (b) comprising a component (X) (hereinafter, simply also called an (X)) containing an aliphatic hydrocarbon group (x) (hereinafter, simply also called as (x)) having a carbon number of 100 to 1000; and an electrostatic image developing toner containing the binder and a colorant.

BEST MODE FOR CARRYING OUT THE INVENTION

The carbon number of the aliphatic hydrocarbon group (x) is normally from 100 to 1000. The lower limit is preferably 120; the upper limit is preferably 800, more preferably 300. Environmental stability is good in the range of a carbon number of 100 to 1000, and the resultant polyester resin has an extremely slight odor.

The carbon number of (x)'s can be calculated from the equation below using the number average molecular weight (hereinafter, Mn) of a component (X) containing an (x) and a number of functional groups per molecule (average functional group number) in (X).

Carbon number=(Mn−average functional group number×molecular weight of functional group)÷14

Above and below, Mn and the weight average molecular weight (hereinafter, Mw) of an (X) are determined by means of Gel Permeation Chromatography (GPC) (solvent: orthodichlorobenzene, reference material: polystyrene).

An (X) includes a carboxylic acid component (Xa) containing an (x) (hereinafter, simply also called as (Xa)), an alcohol component (Xb) containing an (x) (hereinafter, simply also called as (Xb)), and a combination thereof.

The average functional group number of an (X), from the viewpoint of polyester resin synthesis, is normally 1 or more. The lower limit is preferably 1.6, more preferably 1.8, particularly preferably 1.9; the upper limit is preferably 6, more preferably 4, particularly 2.1. However, the average functional group number of one acid anhydride group is regarded as 2.

Hereby, the average functional group number can be evaluated from the value of Mn and the hydroxyl value, the acid value or the saponification number of an (X) by means of the following equation ① or ②.

When the functional group is a hydroxyl group, a carboxyl group, or an ester group: Average functional group number=$Mn$×[hydroxyl value, acid value, or saponification number of an $(X)$]÷56100  ①

When the functional group is an acid anhydride group: Average functional group number=$Mn$×[acid value of an $(Xa)$]×2÷56100  ②

In addition, in the present invention, the acid value of an (Xa) is determined by heating and dissolving the (Xa) in xylene and by titrating through the use of an alcoholic KOH solution in a heated state so that the acid value obtained, when the functional group is an acid anhydride, is a half esterification acid value, thus the average functional group number for an acid anhydride group is calculated from the equation ②.

An (Xa) includes a carboxy-modified polyolefin (Xa1), e.g., a polyolefin obtained by modifying a polyolefin having a carbon number of 100 to 1000, with an unsaturated carboxylic acid or by oxidation.

Examples of the aforementioned polyolefin include (co) polymers of olefins such as ethylene, α-olefins having a carbon number of 3 to 8 (preferably 3 and 4, particularly 3) (propylene, 1-butene, isobutene, 1-hexene, 1-octene, and the like), mixtures of two or more species thereof (e.g., mixtures of 10 to 90% of ethylene and 10 to 90% of an α-olefin having a carbon number of 3 to 8). The preferred of these include polyethylene, polypropylene, and an ethylene/propylene copolymer. Also, % above and below indicates % by weight, unless otherwise specified.

The polyolefins include a polyolefin produced by polymerizing the above-described olefin with a well-known olefin polymerization catalyst (a Ziegler type catalyst, a Kaminsky type catalyst, or the like), or a low density polyethylene (LDPE) obtained by high-pressure polymerization, or a thermal depolymerization type polyolefin obtained by heat decomposing (thermal depolymerizing) at an elevated temperature (e.g., 280 to 390° C.) a high molecular weight polyolefin (Mn 50,000 to 500,000 or more) similarly polymerized. The preferred of these include an unsaturated bond-containing polyolefin, particularly a thermal depolymerization type polyolefin. The content of unsaturated bonds is preferably from 0.4 to 10 for a carbon number of 1000, particularly 0.6 to 8.

Unsaturated carboxylic acids used in the modification include a mono- and a polycarboxylic acid, having a carbon number of 3 to 10 or more, for example an unsaturated dicarboxylic acid (anhydride) (e.g., maleic acid, fumaric acid, itaconic acid, citraconic acid, or the like, or an acid anhydride thereof), an unsaturated monocarboxylic acid [e.g., (meth)acrylic acid, (iso)crotonic acid, or cinnamic acid]. The preferred of these include an unsaturated dicarboxylic acid (particularly maleic acid) (anhydride), and more preferred include maleic anhydride.

An (Xa) can be obtained, for example, by the following methods.

① A method that allows a polyolefin to react with an unsaturated dicarboxylic acid or an ester forming derivative thereof in the presence of a radical generating agent (e.g., benzoylperoxide, di-t-butylperoxide, or t-butylperoxybenzoate).

② A method that involves thermally adding an unsaturated dicarboxylic acid or an ester forming derivative thereof to an unsaturated bond-containing polyolefin using the ene reaction (e.g., at a temperature of 190° C. or more).

③ Oxidation with oxygen and/or ozone (e.g., a method described in U.S. Pat. No. 3,692,877).

Above and below, the ester forming derivatives of carboxylic acid include acid anhydrides, lower alkyl (carbon number of 1 to 4) esters (methyl ester, ethyl ester, isopropyl ester, and the like), and acid halides (chlorides of acids, and the like).

The preferred of these include the methods of ① and ② and more preferred include the method of ②. The amount of unsaturated dicarboxylic acid or an ester forming derivative thereof used in modification of ① and ② is preferably from 0.5 to 40% based on the weight of the polyolefin, more preferably from 1 to 30%.

The acid value of an (Xa) is preferably from 5 to 100 (mg KOH/g). More preferably, the lower limit is 10 and the upper limit is 70. In addition, the value of Mn is preferably from 1,500 to 14,000, more preferably from 1,800 to 10,000.

An (Xb) includes hydroxyl-terminated polyalkadienes (Xb1) that may be hydrogenated (hereinafter, simply also called as (Xb1)), e.g., hydroxyl-terminated polydienes having the value of Mn of 1,500 to 14,000 [polybutadiene and polyisoprene having a hydroxyl terminal, and the like], hydrogenated compounds thereof, and the like; hydroxyl-modified polyolefins [e.q., reaction products of the aforementioned (Xa) (maleic anhydride-modified polyolefins, and the like) and alkanolamines (carbon number of 2 to 4: ethanolamines, and the like)]; and oxoalcohols derived from unsaturated bond-containing polyolefins. The preferred of these include an (Xb1).

The hydroxyl value of an (Xb) is preferably from 10 to 100 (mg KOH/g). More preferably, the lower limit is 20 and the upper limit is 70.

An (Xb) is obtainable, for example, by the following methods.

① A method that involves polymerizing a diene monomer (butadiene, isoprene, or the like) using hydrogen peroxide as an initiator and, as required, further adding hydrogen thereto.

② A method that involves polymerizing a diene monomer using an initiator capable of living anionic polymerization (e.g., sodium naphthalate), adding to the polymerization active terminals an alkylene oxide having a carbon number of 2 to 4 (hereinafter, abbreviated as AO) [ethylene oxide, propylene oxide, or tetrahydrofuran (hereinafter, abbreviated as EO, PO, and THF, respectively), 1,2-, 2,3-, or 1,3-butylene oxide], or the like, and then, as required, further adding hydrogen thereto.

The preferred of these include the method of ①.

Of these examples of the (X), from the viewpoint of the flowability of a toner, the preferred include an (Xa). The most preferred species include modified-polyolefins produced by thermally adding maleic anhydride by means of the ene reaction to polyethylene, poly α-olefins (carbon number of 3 to 8) or an ethylene/α-olefin (carbon number of 3 to 8) copolymer obtained by thermal depolymerization of polyolefins.

The polyester resin (A) includes a polyester (A1) constituted of a component (a) comprising an (Xa) and, as required, other polycarboxylic acids [a dicarboxylic acid (a1) (hereinafter, simply also called as (a1)) and/or a trivalent to hexavalent or more valent polycarboxylic acid (a2) (hereinafter, simply also called as (a2))] and a component (b) comprising an (Xb) and/or other polyols [a diol (b1) (hereinafter, simply also called as (b1)) and/or a trivalent to octavalent or more valent polyol (b2) (hereinafter, simply also called as (b2))]; a polyester (A2) constituted of a component (b) comprising an (Xb) and, as required, other polyols [(b1) and/or (b2)] and a component (a) comprising other carboxylic acids [(al) and/or (a2)]; and a mixture of two or more species thereof. The preferred of these include an (A1)

Examples of the dicarboxylic acid (a1) include a dicarboxylic acid, the aliphatic hydrocarbon group of which has a carbon number of less than 100, specifically an alkanedicarboxylic acid having a carbon number of 4 to 36 (e.g., succinic acid, adipic acid, or sebacic acid) and an alkenylsuccinic acid (e.g., dodecenylsuccinic acid); an alicyclic dicarboxylic acid having a carbon number of 6 to 40 [e.g., a dimmer acid (dilinoleic acid)]; an alkenedicarboxylic acid having a carbon number of 4 to 36 (e.g., maleic acid, fumaric acid, citraconic acid, or mesaconic acid); and an aromatic dicarboxylic acid having a carbon number of 8 to 36 (phthalic acid, isophthalic acid, terephthalic acid, a napthalenedicarboxylic acid, or the like), an ester forming derivative thereof, and the like. The preferred of these include an alkenedicarboxylic acid having a carbon number of 4 to 20 and an aromatic dicarboxylic acid having a carbon number of 8 to 20 and an ester forming derivative thereof.

Examples of the trivalent to hexavalent or more valent polycarboxylic acid (a2) include a polycarboxylic acid, the aliphatic hydrocarbon group of which has a carbon number of less than 100, specifically an aromatic polycarboxylic acid having a carbon number of 9 to 20 (trimellitic acid, pyromellitic acid, or the like), and an ester forming derivative thereof, and the like.

The preferred of these include trimellitic acid, pyromellitic acid, and an ester forming derivative thereof.

Examples of the diol (b1) include a diol, the aliphatic hydrocarbon group of which has a carbon number of less than 100, specifically an alkylene glycol having a carbon number of 2 to 36 (ethylene glycol, 1,2-propylene glycol, 1,3-propylene glycol, 1,4-butanediol, 1,6-hexanediol, or the like); an alkylene ether glycol having a carbon number of 4 to 36 (diethylene glycol, triethylene glycol, dipropylene glycol, polyethylene glycol, polypropylene glycol, polytetramethylene ether glycol, or the like); an alicyclic diol having a carbon number of 6 to 36 (1,4-cyclohexane dimethanol, hydrogenated bisphenol A, or the like); a (poly) oxyalkylene (carbon number of the alkylene group of 2 to 4, the polyoxyalkylene group below is of the same) ether [the number of oxyalkylene units (hereinafter, abbreviated as an AO unit) of 1 to 30] of the aforementioned alicyclic diol; an polyoxyalkylene ether (number of AO units of 2 to 30) of a divalent phenol [a single ring divalent phenol (e.g., hydroquinone) and bisphenols (bisphenol A, bisphenol F, bisphenol S, or the like)], and the like.

The preferred of these include an alkylene glycol having a carbon number of 2 to 12, a polyoxyalkylene ether (number of AO units of 2 to 30) of bisphenols, and a combination thereof (weight ratio being 0:100 to 80:20). More preferred include a polyoxyalkylene ether (number of AO units of 2 to 8) of bisphenols (particularly, bisphenol A), a combination (weight ratio being 100:0 to 20:80) of this and an alkylene glycol having a carbon number of 2 to 12 (particularly ethylene glycol).

Examples of the trivalent to octavalent or more valent polyol (b2) include polyols, the aliphatic hydrocarbon group of which has a carbon number of less than 100, specifically trivalent to octavalent or more valent aliphatic polyalcohols having a carbon number of 3 to 36 (an alkanepolyol and an inner-molecular or an intermolecular dehydrate thereof, for example, glycerin, trimethylolethane, trimethylolpropane, pentaerythritol, sorbitol, sorbitan, polyglycerin, and dipentaerythritol; saccharides and derivatives thereof, for example, sucrose and methylglycoside); a (poly)oxyalkylene ether (number of AO units of 1 to 30) of the aforementioned aliphatic polyalcohols; a polyoxyalkylene ether (number of AO units of 2 to 30) of trisphenols (trisphenol PA, and the like); apolyoxyalkylene ether (number of AO units of 2 to 30) of novolac resins (phenol novolac, cresol novolac, and the like, average polymerization degree of 3 to 60), and the like.

The preferred of these include a trivalent to octavalent or more valent aliphatic polyalcohol and a polyoxyalkylene ether (number of AO units of 2 to 30) of novolac resins, and more preferred include a polyoxyalkylene ether (number of AO units of 2 to 30) of novolac resins.

Also, in addition to an (X), an (a1), an (a2), a (b1), and a (b2), other aliphatic or aromatic hydroxycarboxylic acids having a carbon number of 4 to 20 (hydroxyl stearic acid and hardened castor oil fatty acid, and the like), and lactones having a carbon number of 6 to 12 (caprolactone, and the lik) can be used as well.

When an (A) contains an (X) and aforementioned other polyol and/or other polycarboxylic acid as constituents thereof, in a molecular chain of the (A), a portion between the (X)'s adjacent to each other in the molecular chain and a portion between the molecular terminal and the nearest (X) to the molecular terminal comprise said other polyol, said other carboxylic acid, or a polycondensate of said other polyol and said other polcalboxylic acid. From a viewpoint of making a fixing temperature width wide, said other calboxylic acid preferably has the molecular weight range of from the relative molecular weight of 98 to Mn of 950, and said other polyol preferably has the molecular weight range of from the relative molecular weight of 62 to Mn of 950. It is more preferable that an Mn of the polycondensate of other carboxylic acid and other polyol is 950 or less.

An (A) can be produced by a method similar to a method of normally producing a polyester. For instance, the methods include a method of condensation polymerizing (esterification and/or ester modification) a (b) and an (a), and a method of reacting a (b) with an acid anhydride of (a)'s and an AO.

The reaction temperature for obtaining an (A) is not particularly limited, but preferably from 150 to 280° C., more preferably 160 to 250° C., particularly from 170 to 235° C. Also, the reaction time, from the standpoint of definitely carrying out the condensation polymerization reaction, is preferably 30 minutes or more, particularly from 2 to 40 hours. At this time, as required, an esterification catalyst can be employed as well. Examples of the esterification catalyst include a tin-containing catalyst (e.g., dibutyltin oxide), antimony trioxide, a titanium-containing catalyst (e.g., a titanium alkoxide, potassium titanyl oxalate, or titanium terephthalate), a zirconium-containing catalyst (e.g., zirconyl acetate), zinc acetate, and the like. To improve the reaction rate of the last reaction stage, reducing the pressure is also effective.

The equivalent ratio [OH]/[COOH] of the hydroxyl group [OH] of a component (b) constituting an (A) to the carboxyl group [COOH] of an (a) constituting an (A) is normally from 2/1 to 1/2, preferably from 1.8/1 to 1/1.8, particularly from 1.5/1 to 1/1.5.

For the use ratio of an (a2) and a (b2), the sum of the mol numbers of an (a2) and a (b2) is normally from 0 to 40 mol % for the total of the mol number of an (a) and a (b), preferably from 0 to 25 mol %, particularly from 0 to 20 mol %. In addition, in the case of containing in an (X) a trivalent or more valent species, the total ratio of the mol number including the mol number of said species is preferably within the aforementioned range for the total mol number of an (a), a (b), and an (X).

The content of the (x) in an (A) can be normally set arbitrarily, but, from the viewpoint of balance among storage stability, fixing performance and grindability of a toner, is preferably from 0.1 to 20%. The lower limit is more preferably 0.2%, particularly 0.5%; the upper limit is more preferably 10%, particularly 5%.

Also, the content of the (Xa) in an (a), and the content of the (Xb) in a (b), are preferably set so that the content of the (x) in an (A) is within the aforementioned range.

In the present invention, a THF soluble fraction and a THF insoluble fraction of an (A) are obtained by the following method.

Into a 200 ml Erlenmeyer flask with a stopper is precisely weighed about 0.5 g of a sample, thereto is added 50 ml of THF and the resultant mixture is refluxed with agitation for 3 hours and then cooled. The THF insoluble fraction is separated by filtration with a glass filter. This filtrate is used as the THF soluble fraction.

Moreover, % of the THF insoluble fraction that will be described below is calculated from the weight ratio of the weight of the resin fraction on the glass filter after reduced-pressure drying at 80° C. for 3 hours to the weight of the sample.

For the values of the largest peak molecular weight (hereinafter, also called Mp), Mn and Mw of the THF soluble fraction of an (A), the value of Mp is preferably from 1,000 to 30,000, the value of Mn from 800 to 100,000, and the value of Mw from 1,500 to 10,000,000; more preferably the value of Mp is from 1,500 to 25,000, the value of Mn from 1,000 to 95,000, and the value of Mw from 1,800 to 8,000,000; particularly preferably the value of Mp is from 1,800 to 20,000, the value of Mn from 1,500 to 70,000, and the value of Mw from 2,000 to 5,000,000. When the value of Mp is 1,000 or more, the value of Mn is 800 or more, and the value of Mw is 1,500 or more, a resultant toner is good in thermal storage stability and powder flowability; if the value of Mp is 30,000 or less, the value of Mn is 100,000 or less, and the value of Mw is 10,000,000 or less, a resulting toner is improved in grindability and is good in productability.

Above and below, Mp, Mn, and Mw of a THF soluble fraction of a polyester resin are determined by GPC under the following conditions.
Apparatus: HLC-8120, product of Tosoh Corp.
Column: TSKgelGMHXL (two) TSKgelMultiporeHXL-M (one)
Measurement temperature: 40° C.
Sample solution: 0.25% THF solution
Injection amount of solution: 100 µl
Detection device: refraction index detector
Reference material: polystyrene Molecular weight corresponding to the largest peak on the chromatogram obtained is called the largest peak molecular weight (Mp).

From the viewpoint of low temperature fixing properties, the THF insoluble fraction of an (A) is preferably not more than 70%, more preferably from 0 to 60%, particularly from 0 to 50%.

The glass transition temperature (Tg) of an (A), in terms of thermal storage stability and low temperature fixing properties, is preferably from 40 to 90° C., more preferably from 45 to 80° C., particularly from 50 to 75° C.

Additionally, above and below, Tg is determined using DSC20, SSC/580 available from Seiko Instruments Inc. by the method (DSC method) specified in ASTM D3418-82.

Moreover, the electric resistance value (log R) measured at 100 kHz of an (A) is preferably from 10 to 12, more preferably from 10.4 to 11.6. The electric resistance value can be determined with a dielectric loss measuring device TR-1000 available from Ando Electric Co., Ltd.

A toner binder of the present invention, within the range of not extremely losing the properties thereof, can be used along with another binder resin.

The other resins include, for example, a polyester resin not containing an (x) [polyester of a (b) comprising a (b1) and/or a (b2) and an (a) comprising an (a1) and/or an (a2)], a styrene-based resin, an epoxy resin and an urethane resin.

As styrene-based resins, there can be used a styrene polymer and a copolymer of styrene and another vinyl monomer (e.g., weight ratio being from 99:1 to 30:70), and the like.

For the polymerization reaction, a well-known polymerization reaction catalyst and the like can be used.

Examples of said another vinyl monomers include the monomers of ① to ⑦ below and a combination thereof.

① Vinyl-based monomers containing a carboxyl group or a carboxylate group:

①-1) An unsaturated monocarboxylic acid having a carbon number of 3 to 20: (meth)acrylic acid, crotonic acid, cinnamic acid, and the like;

①-2) An unsaturated dicarboxylic acid having a carbon number of 4 to 30 and an acid anhydride and a mono- or dialkyl (carbon number of the alkyl of 1 to 18) ester thereof: for example, maleic acid, fumaric acid, itaconic acid and citraconic acid, and the acid anhydrides thereof, and a mono- or dialkyl (carbon number of the alkyl of 1 to 18) ester (methyl ester, ethyl ester, or the like) thereof;

①-3) Unsaturated carboxylic acid hydrocarbyl (carbon number of 1 to 24) esters, having a carbon number of 3 to 30: for example, methyl, ethyl, butyl, 2-ethylhexyl, stearyl, eicosyl, cyclohexyl, and benzyl(meth)acrylates;

①-4) Unsaturated carboxylic acids poly(2 to 3)alcohol esters, having a carbon number of 3 to 30: for example, ethylene glycol, propylene glycol, and 1,6-hexanedioldi (meth)acrylates;

①-5) Esters of unsaturated alcohols [vinyl, isopropenyl, and the like] having a carbon number of 2 to 20 and mono- or polycarboxylic acids having a carbon number of 1 to 12: vinyl alkanoates (acetate, propionate, and butylate), and the like.

② Vinyl-based monomers containing a hydroxyl group:

②-1) Hydroxyalkyl(meth)acrylates having a carbon number of 5 to 16, for example, hydroxyethyl(meth)acrylate and hydroxypropyl(meth)acrylate;

②-2) Alkenols having a carbon number of 2 to 12, for example, (meth)allylalcohol, 1-butene-3-ol and 2-butene-1-ol;

②-3) Alkenediols having a carbon number of 4 to 12, for example, 2-butene-1,4-diol;

②-4) Alkenyl ethers having a carbon number of 3 to 30, for example, 2-hydroxyethylpropenyl ether, sucrose allyl ether, and the like.

③ Vinyl-based hydrocarbons:

③-1) Aromatic vinyl-based hydrocarbons other than styrene (carbon number of 8 to 20): hydrocarbyl (alkyl, cycloalkyl, aralkyl and/or alkenyl) substitution products of styrene, for example, α-methylstyrene, vinyltoluene, 2,4-dimethylstyrene, ethylstyrene, phenylstyrene, cyclohexylstyrene, benzylstyrene, crotylbenzene, divinylbenzene, divinyltoluene, divinylxylene and trivinylbenzene; and vinylnaphthalene.

③-2) Aliphatic vinyl-based hydrocarbons: alkenes having a carbon number of 2 to 20, for example, ethylene, propylene, butene, isobutylene, pentene, heptene, diisobutylene, octene, dodecene, octadecene, α-olefins other than the aforementioned species, and the like; alkadienes having a carbon number of 4 to 20, for example, butadiene, isoprene, 1,4-pentadiene, 1,5-hexadiene and 1,7-octadiene;

③-3) Alicyclic vinyl-based hydrocarbons (carbon number of 5 to 20): mono- and dicycloalkenes and alkadienes, for example, cyclohexene, (di)cyclopentadiene, vinylcyclohexene and ethylidenebicycloheptene; terpenes, for example, pinene, limonene, and indene.

④ Epoxy group-containing vinyl-based monomers: glycidyl (meth)acrylate, and the like.

⑤ Nitrile group-containing vinyl-based monomers: (meth)acrylonitrile, and the like.

⑥ Isocyanate group-containing vinyl-based monomers: (meth)acryloylisocyanate, and the like.

⑦ Amino group-containing vinyl-based monomers: primary to tertiary amino group-containing (meth)acrylate [for example, aminoethyl, dimethylaminoethyl, diethylaminoethyl, and t-butylaminoethyl(meth)acrylate], corresponding (meth)acrylamides [for example, N-aminoethyl(meth)acrylamide], alkenylamines [for example, (meth)allyl and crotylamine], heterocyclic amino group-containing vinyl-based monomers [for example, morphorinoethyl(meth)acrylate, 4-vinylpyridine, and vinylimidazole], and the like.

Epoxy resins include polyadducts of polyepoxides and a (b1) and/or a (b2), and cured products of a polyepoxide and an (a1) and/or an (a2), and the like.

Polyaddition reaction and curing reaction can use well-known catalysts, and the like.

Polyepoxides include aromatic polyepoxides, heterocycle-containing polyepoxides, alicyclic polyepoxides, and aliphatic polyepoxides, having 2 to 10 or more epoxy groups, and the like.

Examples of the aromatic polyepoxides include polyphenolglycidyl ethers (e.g., bisphenol F diglycidyl ether, bisphenol A diglycidyl ether, bisphenol B diglycidyl ether, bisphenol AD diglycidyl ether, and bisphenol S diglycidyl ether); aromatic polycarboxylic acid diglycidyl esters (e.g., phthalic acid diglycidyl ester, isophthalic acid diglycidyl ester and terephthalic acid diglycidyl ester); glycidyl aromatic polyamines (e.g., N,N-diglycidyl aniline, N,N,N',N'-tetraglycidyl xylylenediamine and N,N,N',N'-tetraglycidyl phenylmethanediamine), and the like.

Examples of the heterocyclic polyepoxides include trisglycidylmelamine, and the like.

Examples of the alicyclic polyepoxides include, for example, vinylcyclohexenedioxide, limonenedioxide, dicyclopentadienedioxide, and bis(2,3-epoxycyclopentyl)ether.

The aliphatic polyepoxides include polyglycidyl ethers of aliphatic polyalcohols [the aforementioned (b1) and (b2)] (e.g., ethylene glycol diglycidyl ether, propylene glycol diglycidyl ether and tetramethylene glycol diglycidyl ether); polyglycidyl esters of polycarboxylic acids [the aforementioned (a1) and (a2)] (e.g., diglycidyl oxalate and diglycidyl malate); glycidyl aliphatic amines (e.g., N,N,N',N'-tetraglycidyl hexamethylene diamine), and the like.

Polyurethane resins for the use include polyadducts of organic polyisocyanates and polyols [e.g., an (Xb), a (b1), a (b2), polyester polyols obtained by condensation polymerizing a (b1) and/or a (b2) and an (a1) and ring-opened polymers of lactone having a carbon number of 6 to 12 and combinations thereof], and the like.

The polyaddition reaction can utilize well-known polyaddition reaction catalysts and the like.

Polyisocyanates for the use include aromatic polyisocyanates having a carbon number of 6 to 20 (excluding the carbon in the NCO group, hereinafter the same) [e.g., 1,3- or 1,4-phenylenediisocyanate, 2,4- or 2,6-tolylenediisocyanate (TDI), crude TDI, 2,4'- or 4,4'-diphenylmethanediisocyanate (MDI) and crude MDI]; aliphatic polyisocyanates having a carbon number of 2 to 18 [e.g., ethylene diisocyanate, tetramethylene diisocyanate, hexamethylene diisocyanate and dodecamethylenediisocyanate]; alicyclic polyisocyanates having a carbon number of 4 to 15 [e.g., isophotone diisocyanate, dicyclohexylmethane-4,4'-diisocyanate (hydrogenated MDI), cyclohexylene diisocyanate and methylcyclohexylene diisocyanate (hydrogenated TDI)]; aralipahtic polyisocyanates having a carbon number of 8 to 15 [e.g., m- or p-xylylene diisocyanate and α, α, α', α'-tetrametylxylylene diisocyanate]; and modified species of the polyisocyanates thereof (urethane, carbodiimide, allophanate, urea, burette, urethodione, urethoimine, isocyanurate, or oxazolidone group-containing modified species and the like): and mixtures of two or more species thereof, and the like.

The values of Mw of the other resins are normally from 1,000 to 2,000,000.

The content of said other resin is normally from 0 to 80%, based on the total weight of the polyester resin (A) and the other resin, preferably from 0 to 50%, particularly from 0 to 25%.

An electrostatic image developing toner of the present invention contains a toner binder of the present invention, a colorant and a variety of additives such as, as required, a releasing agent, a charge controlling agent, a flowability providing agent.

As the colorant a dye or a pigment can be employed. For example, the colorant includes carbon black, black iron oxide, Sudan black SM, Fast yellow G, Benzidine yellow, Pigment yellow, Indofast orange, Irgasin red, Para-nitroaniline red, Toluidine red, Carmine FB, Pigment orange R, Lake red 2G, Rhodamine FB, Rhodamine B lake, Methylviolet B lake, Phthalocyanine blue, Pigment blue, Brilliant green, Phthalocyanine green, Oil yellow GG, Kayaset YG, Orasol Blown B, Oil pink OP, or the like.

In addition, magnetic powders as necessary (ferromagnetic metal powders of iron, cobalt, nickel and the like, and compounds of magnetite, hematite, ferrite and the like) can be contained, which can also be a colorant.

The releasing agent preferably has a softening temperature of 50 to 170° C., and examples of the releasing agent normally include polyolefin waxes, natural waxes, aliphatic alcohols having a carbon number of 30 to 50, aliphatic acids having a carbon number of 30 to 50, mixtures thereof, and the like.

The polyolefin waxes include (co)polymers [including species obtained by (co)polymerization as well as thermal depolymerization type polyolefins] of olefins (e.g., ethylene, propylene, 1-butene, isobutylene, 1-hexene, 1-dodecene, 1-octadecene, mixtures thereof, and the like), oxidized species of the (co)polymers of olefins with oxygen and/or ozone, maleic acid [e.g., maleic acid and derivatives thereof (maleic anhydride, monomethyl maleate, monobutyl maleate, dimethyl maleate and the like)] modified species of the (co)polymers of olefins, copolymers of olefins and unsaturated carboxylic acids [(meth)acrylic acid, itaconic acid and maleic anhydride, and the like] and/or unsaturated carboxylic acid alkyl esters [(meth)acrylic acid alkyl (carbon number of the alkyl of 1 to 18) esters and maleic acid alkyl (carbon number of the alkyl of 1 to 18) esters and the like] and the like, Sasol waxes, and the like.

The natural waxes include, for example, Carnauba wax, Montan wax, paraffin wax, and rice wax.

The aliphatic alcohols having a carbon number of 30 to 50 include, for example, triacontanol.

The aliphatic acids having a carbon number of 30 to 50 include, for example, triacontanecarboxylic acid.

The charge controlling agents include a nigrosin dye, a tertiary ammonium salt, a tertiary ammonium base-containing polymer, a metal-containing azo dye, a metal salicylate, a sulfonic group-containing polymer, a fluorine-containing polymer, a halogen-substituted aromatic ring-containing polymer, and the like.

The flowability providing agents include colloidal silica, alumina powders, titanium oxide powders, calcium carbonate powders, and the like.

With the composition proportions of an electrostatic image developing toner of the present invention, based on a toner weight, a toner binder is normally from 30 to 97%, preferably from 40 to 95%, more preferably from 45% to 92%; a colorant is normally from 0.05 to 60%, preferably from 0.1 to 55%, more preferably from 0.5 to 50%; of additives, a releasing agent is normally from 0 to 30%, preferably from 0.5 to 20%, more preferably from 1 to 10%; a charge controlling agent is normally from 0 to 20%, preferably from 0.1 to 10%, more preferably from 0.5 to 7.5%; a flowability providing agent is normally from 0 to 10%, preferably from 0 to 5%, more preferably from 0.1 to 4%. In addition, the total content of additives is normally from 3 to 70%, preferably from 4 to 58%, more preferably from 7 to 50%. A toner, the composition proportions of which are within the aforementioned ranges, can easily be obtained that is good in electrostatic property.

Methods for obtaining an electrostatic image developing toner of the present invention are not particularly limited, but can include a method that involves dry blending the components comprised of a toner exclusive of a flowability providing agent, melt blending, then roughly grinding, finally pulverizing the resulting mixture using a jet pulverizer or the like, further classifying to produce particulates having a particle diameter (D50) of normally from 5 to 20 microns, and subsequently blending the flowability providing agent to yield the toner; and the like.

Additionally, the particle diameter (D50) can be determined by means of a Coulter counter [e.g., trade name: Multisizer III (product of Coulter Corp.)].

An electrostatic image developing toner of the present invention is used as a developing agent of an electric latent image, which can be produced, as required, by blending carrier particles such as iron powder, glass beads, nickel powder, ferrite, magnetite, and a ferrite the surface of which is coated with a resin (an acryl resin, a silicone resin, or the like) The weight ratio of the toner to the carrier particles is normally 1/99 to 100/0.

Moreover, a member such as a charge blade instead of carrier particles is rubbed therewith to be capable of forming an electric latent image as well.

An electrostatic image developing toner of the present invention is subjected to fixation on a support (paper, a polyester film, or the like) using a copier, a printer, or the like to be made a recorded product. As methods of fixing on a support, the well-known heated roll fixing process, the flash fixing process, or the like can be applied.

EXAMPLES

Hereinafter, the present invention will be set forth in further detail in terms of Production Examples and Examples, but the invention is by no means limited thereto. Below, parts indicate parts by weight.

Testing methods are in the following.

(1) Preparation of a Developer

30 Parts of a toner and 800 parts of a ferrite carrier (F-150, product of Powder Tech Co., Ltd.) are homogeneously blended to yield a two-component developer.

(2) The Minimum Fixing Temperature (Hereinafter, Also Called MFT) and the Hot Offset Occurrence Temperature (Hereinafter, Also Called HOT)

An unfixed image developed with a commercial copier [AR5030, product of Sharp Corp.] using the above-mentioned two-component developer is fixed at a process speed of 80 mm/second by means of a fixing machine made by remodeling the fixing unit of a commercial full color copier [LBP-2160, product of Canon Inc.] to render variable the heat roller temperature. The heat roller temperature at which the residue percentage of the image density after the fixed image is rubbed with a cloth pad is 70% or more is defined as the minimum fixing temperature (MFT). Also, the temperature at which the hot offset visually starts is defined as the hot offset occurrence temperature (HOT).

(3) Image Density and Environmental Stability

An unfixed image developed with a commercial copier [AR5030, product of Sharp Corp.] using the above-mentioned two-component developer is fixed at a heat roller temperature of 190° C. at a process speed of 80 mm/second with the fixing unit of a commercial full color copier [LBP-2160, product of Canon Inc.]. The image density of the fixed image is determined using a Macbeth densitometer.

A density in which development is carried out at 23° C./50% RH refers to an image density (N/N) and at 35° C./85% RH an image density (H/H)

Furthermore, when the difference between the image density (N/N) and the image density (H/H) is:

① from 0 to less than 0.2, the image is considered to be environmental stability A.

② from 0.2 to less than 0.4, the image is considered to be environmental stability B.

③ 0.4 or more, the image is considered to be environmental stability C. A and B are in a practical range.

(4) Odor

After a glass odor bottle in which a toner is placed is kept airtight, and maintained at 35° C. for 24 hours, the cap is opened and the odor is evaluated. The evaluation is conducted by five persons by means of sensory testing.

① When one or less person feels an unpleasant odor, the rating is as ○.

② When two to three persons feel an unpleasant odor, the rating is as Δ.

③ When four or more persons feel an unpleasant odor, the rating is as X.

Production Example 1

In a reaction bath fitted with a reflux condenser, a stirrer and a nitrogen introducing tube were placed 100 parts of Viscol HTP available from Sanyo Chemical Industries Ltd. (thermal depolymerized polyolefin; Mn 2300, Mw 7700, carbon number about 164, melt viscosity 70 mPa.s/at 160° C., ring and ball softening temperature 148° C.), 400 parts of xylene and 3 parts of maleic anhydride and therein was dropped a mixture solution of 0.25 part of t-butyl peroxide and 5 parts of xylene under a pressurized nitrogen atmosphere at 173° C. After a reaction was carried out at 170° C. for 2 hours, the inside pressure of the system was gradually reduced to 5 mmHg to remove the solvent and the unreacted maleic anhydride by distillation, thereby obtaining a maleic anhydride-modified polyolefin (X-1) The (X-1) had an acid value of 14, a value of Mn of 4100, and an average functional group number of 2.05.

Production Example 2

In a stainless steel autoclave equipped with a stirrer and a temperature controlling function were placed 100 parts of Viscol 660P [a thermal depolymerized polyolefin available from Sanyo Chemical Industries Ltd.; average carbon number about 180, unsaturated bond number of 5.5 for carbon number 1000], and 10 parts of maleic anhydride and a reaction was conducted at 210° C. for 20 hours to yield a maleic anhydride-modified polyolefin (X-2) by means of the ene reaction. The (X-2) had an acid value of 21.9, a value of Mn of 2510, and an average functional group number of 1.96.

Production Example 3

In a reaction bath as in Production Example 1 were placed 7 parts of the (X-1), 739 parts of PO (2 mol) adduct of bisphenol A, 176 parts of terephthalic acid, 78 parts of maleic anhydride and 3 parts of dibutyltin oxide as a condensation catalyst, and a reaction was carried out at 200° C. in a nitrogen flow for 10 hours while conducting distillation removing water to be formed. Then, the resultant mixture was reacted under a reduced pressure of 20 to 40 mmHg and the resulting mixture was taken out when the softening temperature became 104° C. to thereby obtain a polyester resin (A-1). The content of hydrocarbon group (x) in the (A-1) was 0.7%.

Production Example 4

A polyester resin (A-2) was obtained as in Production Example 3 except that the (X-1) was replaced with the (X-2). The content of (x) in the (A-2) was 0.7%.

Production Example 5

In a reaction bath as in Production Example 1 were placed 7 parts of the (X-2), 309 parts of PO (2 mol) adduct of bisphenol A, 355 parts of EO (2 mol) adduct of bisphenol A, 21 parts of EO (5 mol) adduct of phenol novolac (average condensation degree about 5), 121 parts of terephthalic acid, 74 parts of fumaric acid and 3 parts of dibutyltin oxide as a condensation catalyst, and a reaction was carried out at 210° C. in a nitrogen flow for 10 hours while conducting distillation removing water to be formed. Then, a reaction was carried out under a reduced pressure of 5 to 20 mmHg until the acid value became 2 or less. Subsequently, thereto was added 87 parts of trimellitic anhydride, and a reaction was conducted under atmospheric pressure for one hour, and then a reaction was carried out under a reduced pressure of 20 to 40 mmHg to take out the resultant mixture when the softening temperature became 120° C., thereby obtaining a polyester resin (A-3). The content of (x) in the (A-3) was 0.7%.

Production Example 6

In a Plastomill (trade name) were placed 500 parts of the (A-2) and 500 parts of the (A-3), and the resulting mixture was melt mixed at 155° C. for 5 minutes with stirring to thereby obtain a polyester resin (A-4). The content of (x) in the (A-4) was 0.7%.

Production Example 7

In a reaction bath as in Production Example 1 were placed 6 parts of Polytail H [product of Mitsubishi Chemical Corp., a hydrogenated alkadiene-terminal hydroxylated compound, carbon number about 170, hydroxyl value about 45], 730 parts of PO (2 mol) adduct of bisphenol A, 176 parts of terephthalic acid, 78 parts of maleic anhydride and 3 parts of dibutyltin oxide as a condensation catalyst, and a reaction was carried out at 200° C. in a nitrogen flow for 18 hours while conducting distillation removing water to be formed. Then, the resultant mixture was reacted under a reduced pressure of 20 to 40 mmHg and the resulting mixture was taken out when the softening temperature became 104° C. to thereby obtain a polyester resin (A-5). The content of (x) in the (A-5) was 0.6%.

Comparative Production Example 1

A comparative polyester resin (B-1) was obtained as in Production Example 3 with the exception that the (X-1) was replaced with dodecenylsuccinic acd.

The analysis values of these resins (A-1) to (B-1) are shown in Table 1.

TABLE 1

| Resin | Acid value | Hydroxyl value | Tg (° C.) | THF insoluble fraction (%) | GPC analysis value of THF soluble fraction | | |
|---|---|---|---|---|---|---|---|
| | | | | | Mp | Mn | Mw |
| A-1 | 2 | 28 | 64 | 0.2 | 14100 | 4300 | 14200 |
| A-2 | 2 | 29 | 63 | 0.1 | 14700 | 4500 | 15000 |
| A-3 | 28 | 26 | 58 | 22 | 6000 | 3500 | 21400 |
| A-4 | 14 | 27 | 60 | 12 | 10900 | 4100 | 19900 |
| A-5 | 2 | 25 | 58 | 1 | 15100 | 4500 | 16000 |
| B-1 | 2 | 23 | 65 | 0.1 | 14700 | 4700 | 15100 |

Examples 1 to 5 and Comparative Example 1

100 Parts of a toner binder comprised of a resin indicated in Table 2, 4 parts of the colorant ① [Cyanine Blue KRO, product of Sanyo Color Works, Ltd.] or the colorant ② [Carbon Black MA-100, product of Mitsubishi Chemical Corp.], and 4 parts of the releasing agent ① [Carnauba wax (softening temperature 82° C.)], the releasing agent ② [Viscol 550P (softening temperature 150° C.); product of Sanyo Chemical Industries Ltd.] or the releasing agent ③ [Sasol wax (softening temperature 98° C.)] were melt blended using a twin-screw extruder [PCM-30, product of Ikegai Ltd.]. After the kneaded material was cooled, it was crudely ground, and was pulverized using a supersonic jet pulverizer Labo Jet [product of Nippon Pneumatic Mfg. Co., Ltd.], and then was classified with an air sifter [MDS-I, product of Nippon Pneumatic Mfg. Co., Ltd.] to obtain toner particles having a particle diameter (D50) of about 9 μm. Then, 108 parts of the toner particles and 0.7 part of a flowability providing agent [Aerosil R972, product of Nippon Aerosil Co., Ltd.] were blended (outside blended) to thereby obtain a toner.

Table 2 shows the evaluation results of these toners.

TABLE 2

| | Resin | Colorant | Releasing agent | MFT (° C.) | HOT (° C.) | Odor | Image density N/N | Image density H/H | Environmental stability |
|---|---|---|---|---|---|---|---|---|---|
| Example 1 | A-1 | ① | ① | 120 | 200 | o | 1.54 | 1.37 | A |
| Example 2 | A-2 | ① | ① | 120 | 200 | o | 1.57 | 1.38 | A |
| Example 3 | A-3 | ② | ② | 130 | 235 | o | 1.58 | 1.41 | A |
| Example 4 | A-4 | ② | ③ | 120 | 230 | o | 1.58 | 1.39 | A |
| Example 5 | A-5 | ① | ① | 120 | 200 | o | 1.51 | 1.34 | A |
| Comparative Example 1 | B-1 | ① | ① | 120 | 200 | x | 1.57 | 1.39 | A |

INDUSTRIAL APPLICATION

Use of a toner binder for an electrophotograph of the present invention can provide a toner which is wide in fixing temperature width, which is excellent in environmental stability, and which causes no odor to be generated around the copier even though continuous copying is conducted because the toner does not make a foul smell be generated from the copier and the like. Also, excellent pulverization properties allow a toner to be economically produced during industrial production.

The invention claimed is:

1. A binder for use in an electrostatic image developing toner, comprising: a polyester resin (A) comprised of constituents of a carboxylic acid component (a) and an alcohol component (b), at least a part of the carboxylic acid component (a) is selected from (Xa1) and (or at least a part of the alcohol component (b) is selected from (Xb), wherein (Xa1) and (Xb) comprise an aliphatic hydrocarbon group (x) having a carbon number of 100 to 1000, the average functional group number of (Xa1) and (Xb) being 1.6 or more, wherein:

(Xa1) is a carboxy-modified unsaturated bond-containing polyolefin in which the number of unsaturated bonds is 0.4 to 10 per 1000 carbon atoms in the unmodified polyolefin and has at least one functional group selected from the group consisting of a carboxyl group, an ester group and an acid anhydride group; and (Xb) is an alcohol containing the aliphatic hydrocarbon group (x) and has a hydroxyl group, and wherein the component (a) comprises other polycarboxylic acid and/or the component (b) comprises other polyol, whereby, in a molecular chain of the (A), a portion between the (Xa1)'s, (Xb)'s, or (Xa1) and (Xb) adjacent to each other in the molecular chain and a portion between the molecular terminal and the nearest of (Xa1) and (Xb) to the molecular terminal comprise said other polyol, said other carboxylic acid, or a polycondensale of said other polyol and said other polycalboxylic acid.

2. The binder according to claim 1, wherein the polyester resin (A) contains in the constituents thereof 0.1 to 20% by weight of the aliphatic hydrocarbon group (x).

3. The binder according to claim 1, wherein the carboxy-modified unsaturated bond-containing polyolefin (Xa1) comprises maleic acid (anhydride)-modified polyolefin.

4. The binder according to claim 1, wherein the alcohol (Xb) containing the aliphatic hydrocarbon group (x) comprises a hydroxyl-terminated polyalkadiene (Xb1) that may be hydrogenated.

5. The binder according to claim 1, wherein the average functional group number of (Xa1) and (Xb) is between 1.6 and 6.

6. The binder according to claim 1, wherein the carboxy-modified unsaturated bond-containing polyolefin (Xa1) is obtainable by thermally adding an unsaturated dicarboxylic acid or an ester forming derivative thereof to an unsaturated bond-containing polyolefin using the ene reaction.

7. The binder according to claim 1, wherein the number average molecular weight of the carboxy-modified unsaturated bond-containing polyolefin (Xa1) is from 1,500 to 14,000.

8. The binder according to claim 1, wherein the carboxy-modified unsaturated bond-containing polyolefin (Xa1) comprises a carboxy-modified thermal depolymerization type polyolefin.

9. An electrostatic image developing toner, comprising: the binder according to claim 1 and a colorant.

* * * * *